United States Patent [19]

Blount

[11] 4,323,494
[45] Apr. 6, 1982

[54] PROCESS FOR THE PRODUCTION OF CELLULOSE-SILICATE PRODUCTS

[76] Inventor: David H. Blount, 5450 Lea St., San Diego, Calif. 92105

[21] Appl. No.: 278,089

[22] Filed: Jun. 29, 1981

Related U.S. Application Data

[60] Division of Ser. No. 221,432, Dec. 30, 1980, which is a continuation-in-part of Ser. No. 169,973, Jul. 18, 1980, which is a continuation-in-part of Ser. No. 884,135, Mar. 7, 1978, which is a continuation-in-part of Ser. No. 663,924, Mar. 4, 1976, Pat. No. 4,097,424, which is a continuation-in-part of Ser. No. 599,000, Jul. 7, 1975, Pat. No. 4,072,637, which is a continuation-in-part of Ser. No. 262,485, Jun. 14, 1972, abandoned, which is a continuation-in-part of Ser. No. 71,628, Sep. 11, 1970, abandoned.

[51] Int. Cl.$^3$ .......................................... C08L 83/02
[52] U.S. Cl. ................................. 524/858; 106/162; 106/193 R; 106/287.1; 106/287.12; 106/287.34; 521/100; 521/109; 521/154; 528/44; 527/103; 527/301; 524/588
[58] Field of Search ............ 528/44; 260/37 N, 37 SI, 260/9, 17.4 R, 17.3; 106/287.34, 287.12, 287.1, 193 R, 162

[56] References Cited

U.S. PATENT DOCUMENTS

| | | | |
|---|---|---|---|
| 4,107,140 | 8/1978 | Blount | 521/154 |
| 4,139,549 | 2/1979 | Blount | 521/154 |
| 4,198,491 | 4/1980 | Blount | 525/61 |

Primary Examiner—Morton Foelak

[57] ABSTRACT

A process for impregnating and reacting cellulose particles with oxidated silicon acid to produce lignin-cellulose-silicate and/or cellulose-silicate products impregnated with hydrated silica.

20 Claims, No Drawings

PROCESS FOR THE PRODUCTION OF CELLULOSE-SILICATE PRODUCTS

CROSS-REFERENCE TO RELATED APPLICATIONS

This application is a divisional of U.S. patent application Ser. No. 221,432, filed on Dec. 30, 1980, which is a continuation-in-part of my copending U.S. patent application Ser. No. 169,973, filed July 18, 1980, which is a continuation-in-part of my copending U.S. patent application Ser. No. 884,135, filed Mar. 7, 1978, which is a continuation-in-part of my earlier U.S. patent application Ser. No. 663,924, filed Mar. 4, 1976, now U.S. Pat. No. 4,097,424, which is a continuation-in-part of my earlier U.S. patent application Ser. No. 599,000, filed July 7, 1975, now U.S. Pat. No. 4,072,637, which is a continuation-in-part of my earlier U.S. patent application Ser. No. 262,485, filed June 14, 1972, now abandoned, which is a continuation-in-part of my earlier U.S. patent application Ser. No. 71,628, filed Sept. 11, 1970, now abandoned.

This invention relates to the production of lignin-cellulose-silicate and/or cellulose-silicate products impregnated with oxidated silicon acid. This invention produces novel cellulose-silicate products which contain impregnated oxidated silicon acid and may be used to produce improved paper due to the increased surface area which improves the bonding of the cellulose-silicate products. This novel cellulose-silicate product is also chemically reactive and may be further reacted with many inorganic and organic compounds to produce novel and useful products.

The cellulose-silicate products will react with organic compounds, for example, but are not limited to aldehydes, furan compounds, polyisocyanates, isocyanates, polyurethane prepolymers, polyisocyanate silicate prepolymers, ketones, vinyl acetate, acrylic acid monomers, allyl halides, polyfunctioning alkylating agents, monofunctional alkylating agents, halohydrins, epihalohydrins, other vinyl monomers, amines, polyamines, furfuryl alcohol, epoxide compounds, organic anhydrides, polycarboxylic acid, polycarboxylic acid anhydride, and mixtures thereof.

The cellulose-silicate products will also react with inorganic compounds such as alkali metal oxides and hydroxides, silicon halides, sulfur, sulfuric acid, sulphorous acids, nitric acid, etc. The alkali metal lignin-cellulose-silicate and alkali metal cellulose-silicate products may be further reacted with mono- and poly-substituted organic compounds, e.g., halogenated organic compounds, organic compounds, substituted sulfate, hydrogen sulfate, nitrates, acid phosphates, bicarbonates, formates, acetates, propionate, oxalate, acid malonate, acid tartrate, citrate radicals and other radicals, carbon disulfide and mixtures thereof.

The reaction of oxidized silicate compound with cellulose was discussed in U.S. patent application Ser. No. 71,628, filed by David H. Blount, M. D., on Sept. 11, 1970, but now abandoned. The production of oxidized silicate compounds was discussed in the above-named Application. The production of a stable acidic aqueous solution of silicoformic acid was outlined in U.S. Pat. No. 3,960,747. The acidic aqueous solution of oxidated silicon acids, e.g., silicoformic acid, oxidated silicic acid and mixtures thereof, are produced by adding a dilute alkali metal aqueous solution of oxidated silicon acid to a dilute mineral acid e.g., hydrochloric acid, sulfuric acid, or a dilute organic acid, e.g., acetic acid; this solution is much more stable, contains more oxidated silicon acid and less salt than acidic aqueous solutions of silicic acid produced by adding water glass to a mineral acid. The aqueous alkali metal hydroxide-oxidized silicate solution may contain up to 30% oxidized silicon acid, about 5% to 10% alkali metal hydroxide. The pH of the acidic aqueous solution of oxidated silicon acid is kept below 5 to avoid gel formation. The pH of the acidic aqueous solution of oxidated silicon acids may be regulated by adding buffering acids with pk between 2 and 6. Useful buffering acids include up to 5% by weight, percentage based on mineral acid, of polycarboxylic acids, e.g., adipic acid, citric acid, tartaric, etc., acidic sulphites of acetone or other ketones and aldehydes. Very low pH, below 2, should be avoided because the cellulose will be hydrolyzed, especially in sulfuric acid and hydrochloric acid. Organic acids may be used in the solution to keep the pH below the pH at which gelling takes place and all the mineral acid is utilized in the salt formation, thus avoiding hydrolyzing the cellulose while drying. In the drying process, the impregnated oxidated silicon acid gels and forms a structure with a large surface area; then as it dries, the gel shrinks and has less surface area.

In products utilizing the lignin-cellulose silicate and/or cellulose-silicate product, impregnated with oxidated silicon acid up to 100% by weight, based on weight of dry cellulose, with a binder, it is usually best to add the binder while the lignin-cellulose silicate and/or cellulose-silicate product impregnated with hydrated silica is still wet. Any suitable binder may be utilized. When polyisocyanates, polyisocyanate prepolymer and polyisocyanate silicate prepolymers are utilized as binders, the cellulose-silicate product should contain only a small amount of moisture or be dry.

The cellulose-silicate product may be utilized with a binder to produce paper with improved wet strength, good tear strength and improved chemical resistance to corrosive and oxidative liquids. This paper may be used as filters, for packaging, laminating, etc.

The cellulose-silicate products may be utilized as a reinforcing agent in plastics, concrete, plaster, etc. They may be added to the plastics emulsions and rubber emulsions, then coagulated; then added to plastic molding powder and to a water-binding agent before adding water or while still in a mobile stage.

The binding agent used to produce paper, utilizing cellulose fibers, may be applied to the cellulose fibers to produce paper first, then be reacted with the oxidized silicate to produce cellulose-silicate paper impregnated with oxidized silicon acid.

Regenerated cellulose-silicate products may be produced by adding sodium cellulose xanthine or an aqueous solution of sodium cellulose xanthate silicate aqueous solution, in order to produce an aqueous solution containing up to 20% by weight of an oxidated silicate and up to 20% by weight of sodium cellulose xanthate; this solution is then added slowly to an aqueous solution containing a mineral acid, preferably sulfuric acid, with a concentration of up to 20%; the acidic aqueous solution optionally may contain acid buffers, sodium sulfate 10% to 20%, glucose 2% to 5%, zinc sulfate 1% and other additives. The regenerated cellulose-silicate products may be precipitated in the form of sheets, fibers, sponges, etc. The regenerated cellulose-silicate products may also be produced by adding an aqueous sodium cellulose xanthate solution to an acidic oxidated silicon acid solution while keeping the pH below 5.

Cellulose may be dissolved in sulfuric acid in concentration of 70% to 80%, at ambient temperature and pressure; then an oxidated alkali metal silicate is added until the pH is 1.5 to 5, thereby producing a cellulose-silicate product impregnated with hydrated silica. The acid and salt are removed by filtration.

Lignin-cellulose-silicate and/or cellulose-silicate products impregnated with oxidized silcon acid (hydrated silica) may be produced by mixing in any suitable manner and reacting the following components:
(a) an oxidated silicon compound;
(b) a plant cellulose particle;
(c) a salt-forming compound.

Component (a)

Oxidized silicate compounds are produced by oxidizing an alkali metal silicate or an alkaline earth metal silicate with a mineral acid, an organic peroxide, an inorganic peroxide and the like. The oxidized silicate is readily soluble in an aqueous alkali metal solution. The preferred method to produce an oxidated silicate is to react a dry alkali metal silicate or an alkaline earth metal silicate with a concentrated mineral acid, thereby producing an oxidized silicic acid. The salt is dissolved in water and filtered off.

In an alternate method, oxidized silicate compounds are produced by oxidizing an aqueous solution of alkali metal silicate with a peroxide compound to produce an oxidized alkali metal silicate, then an acidic chemical is added until the alkali is neutralized or reaches a pH of 5 to 7. The oxidized silicic acid precipitates out. The salt is dissolved in water and filtered off. The oxidized silicic acid is readily soluble in dilute alkali metal hydroxides.

Component (b)

Any suitable plant cellulose particles may be used in this invention. Suitable cellulose includes, but is not limited to, sulphite cellulose, sulphate craft cellulose, and semi-chemical pulps as well as mechanical pulps, bleached and unbleached pulps and papers, natural cellulose, e.g., cotton fibers, vegetable fibers, cellulose plant particles, e.g., wood particles, derivatives such as sodium cellulose, sodium cellulose xanthate, regenerated cellulose, cellulose acetate, cellulose propionate, cellulose ethers, etc.

Component (c)

Any suitable salt-forming compound may be used in this invention, such as mineral acids, e.g., sulfuric acid and hydrochloric acid; organic acids, e.g., acetic acid, chloroacetic acid, etc.

The concentration of the mineral acid may vary quite widely from about 5% to greatly concentrated mineral acid.

Sulfuric acid is the preferred salt-forming compound.

DETAILED DESCRIPTION OF THE INVENTION

The components may be mixed in any suitable manner in order to produce lignin-cellulose silicate and/or cellulose silicate product impregnated with hydrated silica.

The preferred process for producing lignin-cellulose and/or cellulose-silicate products impregnated with hydrated silica is to add an oxidated silicon acid compound such as silicic acid and/or silicoformic acid, to a dilute aqueous solution of an alkali metal hydroxide such as sodium hydroxide and/or potassium hydroxide in the ratio of NaOH to oxidized silicon acid of from 1:4 to 1:8, then to mix the solution with cellulose particles in the ratio of 10 parts by weight of the oxidized silicon compound to 1 to 30 parts by weight of cellulose particles; this mixture is then added to a dilute aqueous solution of a mineral acid such as sulfuric acid or hydrochloric acid containing 1% to 20% mineral acid and in sufficient amount wherein the pH of the solution remains between 1.5 and 5 after the alkali metal radical has reacted with the salt-forming compound to produce a salt. The lignin-cellulose-silicate and/or cellulose-silicate products containing impregnated oxidated silicic acid is removed by filtration and dried.

When plant particles are used that contain lignin, the lignin-cellulose bond in most particles is not broken.

In an alternate process to produce lignin-cellulose-silicate and/or cellulose-silicate products, impregnated with oxidated silicic acid (hydrated silica), the oxidated silicon acid is added to an aqueous alkali metal hydroxide solution such as sodium hydroxide or potassium hydroxide wherein the ratio by weight of alkali metal hydroxide to oxidated silicon acid is from 1:4 to 1:8, in order to produce a solution of the oxidated silicon acid in the aqueous alkali metal hydroxide. The oxidated silicon acid will dissolve more rapidly in a warm or hot aqueous alkali metal hydroxide solution. The alkali metal-oxidized silicate solution is then added to a mineral acid while agitating until the pH is between 1.5 and 5, thereby producing an oxidated silicon acid solution. When the mineral acid is sulfuric acid, the salt produced may be removed by cooling to $-1°$ C. when the sodium sulphate is crystallized and then filtered off. The salt may also be removed by a strong cation exchanger which absorbs the sodium ions. Due to the small amount of alkali metal hydroxide used, it is usually not necessary to remove the salt. Plant particles, cellulose or altered cellulose, e.g., rayon or cellulose acetate, is added to the mineral acid solution of oxidated silicon acid, then removed and dried, thereby producing lignin-cellulose silicate and/or cellulose-silicate product which is impregnated with oxidized silicon acid (hydrated silica).

In an alternate method, an aqueous alkali metal silicate solution, e.g., oxidized water glass, is mixed with the plant particles, cellulose or altered cellulose, preferably using an excess amount of the aqueous oxidized alkali metal solution, then is heated to a temperature between ambient temperature and the boiling temperature of the solution at ambient pressure for 1 to 12 hours, thereby producing a lignin-cellulose alkali metal silicate and/or cellulose alkali metal silicate product. The excess aqueous oxidized alkali metal silicate solution is pressed from the cellulose. The lignin-cellulose alkali metal silicate and/or cellulose alkali metal silicate product is then added to a salt-forming compound, preferably 5% to 20% sulfuric acid or hydrochloric acid, until the pH is 1.5 to 5; the acid and salt are filtered off, thereby recovering the lignin-cellulose silicate and/or cellulose silicate, impregnated with hydrated silica.

Binders may be added to the lignin-cellulose silicate and/or cellulose product impregnated with hydrated silica in order to produce useful products such as paper, cardboard, construction panels, laminates, etc.

Any suitable binder may be used. Suitable binders include, but are not limited to, plastic binders, e.g., polyvinylacetates, polyacrylates, polyvinylchlorides and copolymers, polyacrylonitrile polymers, polyester resins, polyamide polymers, epihalohydrin polyamine resins, phenoplast resins, aminoplast resins, epoxy resins, and mixtures thereof, plastic silicates, e.g., epihalohydrin polyamine silicate resins, aminoplast silicate resins, phenoplast silicate resins, polyester silicate resins, epoxy silicate resins, polyamide silicate resins, ethylenepolysulfide silicate polymers, polyacrylate silicate polymers, polyvinyl silicate polymers and mixtures thereof, elastomer binders, e.g., polybutadienes, styrene-butadiene copolymers, polychloroprenes and mixtures thereof, water-binding agents, e.g., hydraulic cement, gypsum, burnt lime, synthetic gypsum and mixtures thereof, alkali metal silicates, e.g., sodium silicate, potassium silicate and mixtures thereof, alkali metal aluminates, natural binders, e.g., starch, modified starches, modified cellulose, gums, rosin, regenerated proteins, casein, polyamides from soya beans, peanuts and corn, rubber latex and mixtures thereof.

In most cases, it is preferable to add the binder to lignin-cellulose silicate and/or cellulose silicate products impregnated with hydrated silica while it is still wet, but with the excess water removed. The pH may be adjusted with salts of weak acids, e.g., polycarboxylic acid salts. When alkali binders are used, e.g., water-binding agents, alkali metal silicates, plastic and elastomer emulsions, it is not necessary to adjust the pH. The hydrated silica containing water has a much larger surface than it does after drying. Inorganic and organic fillers may be added with the binder. Compounds may be added to coagulate or precipitate the binder when necessary. The impregnated hydrated silica also acts as a binder when it dries. An excess of binder may be used.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

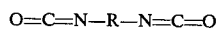

wherein R is a divalent organic radical such as an alkylene, aralkylene or arylene radical. Such suitable radicals may contain, for example, 2 to 20 carbon atoms. Examples of such diisocyanates are:
  tolylene diisocyanate,
  p,p'-diphenylmethane diisocyanate,
  phenylene diisocyanate,
  m-xylylene diisocyanate,
  chlorophenylene diisocyanate,
  benzidene diisocyanate,
  naphthylene diisocyanate,
  decamethylene diisocyanate,
  hexamethylene diisocyanate,
  pentamethylene diisocyanate,
  tetramethylene diisocyanate,
  thiodipropyl diisocyanate,
  propylene diisocyanate, and
  ethylene diisocyanate.

Other polyisocyanates, polyisothiocyanates and their derivatives may be equally employed. Fatty diisocyanates are also suitable and have the general formula:

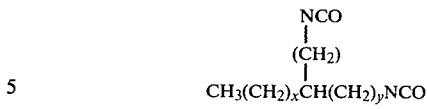

where $x+y$ totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenyl-polymethylene-isocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or bioret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates or aniline or anilines alkyl-substituted on the nucleus, or aldehydes. Ketones may be used in this invention. Solutions of distillation residues accumulating during the production of tolylene diisocyanates, diphenyl methane diisocyanate, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis-(cyclohexyl-4,4') diisocyanate may be used in this invention. Suitable polyisocyanates which may be used according to the invention are described by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and, preferably, from about 1,000 to about 6,000, e.g., polyesters, polyethers, polythioethers, polyacetals, polycarbonates or polyester amides containing at least 2, generally from 2 to 8, but, preferably, dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetra ethylene glycol; polyethylene glycols; dipropylene glycol; polypropylene glycols; dibutylene glycol and polybutylene glycols. The polyesters may also contain a proportion of carboxyl end groups. Polyesters of lactones, such as c-caprolactone, or hydroxycarboxylic acid such as ω-hydroxycaproic acid, may also be used.

The polyethers with at least 2, generally from 2 to 8 and, preferably, 2 or 3, hydroxyl groups used according to the invention are known and may be prepared, e.g., by the polymerization of epoxides, e.g., ethylene oxice, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938, may also be used according to the invention. It is frequently preferred to used polyethers which contain, predominantly, primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Patent No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the cocomponent.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with ureaformaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polysiocyanate curing agents and/or polyisocyanate activators (catalysts) may be used in the process of producing polyurethane resinous or foamed products. The following are examples of polyisocyanate curing agents and activators:
1. Water.
2. Water containing 10% to 70% by weight of an alkali metal silicate, such as sodium and/or potassium silicate. Crude commercial alkali metal silicate may contain other substances, e.g., clacium silicate, magnesium silicate, borates or aluminates and may also be used. The molar ratio of alkali metal oxide to $SiO_2$ is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating is required to start the curing reaction.
6. Water containing 20% to 70% by weight of silica sol.
7. Activators (catalysts) which act as curing agents and are added to the polyurethane silicate prepolymer in the amount of 0.001% to 10% by weight. They may be added in water.
   (a) Tertiary amines, e.g., triethylamine; tributylamine; triethylenediamine; N-methyl-morpholine; N-ethylmorpholine; N,N,N',N'-tetramethylenediamine; 1,4-diamobicyclo-(2,2,2)-octane; N-methyl-N'-dimethylaminoethyl piperazine; N,N-dimethyl-benzylamine; bis(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethylbetaphenylethylamine; and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyldiethanolamine; N-ethyldiethanolamine; and their reactive products with alkylene oxides, e.g., propylene oxide and/or ethylene oxide and mixtures thereof.

(b) Organo-metallic compounds, preferably organo-tin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.

(c) Silaamines with carbon-silicon bonds are described, e.g., in British Patent, No. 1,090,589, may also be used as activators, e.g., 2,2,4-trimethyl-1,2-silamorpholine or 1,3-diethylaminoethyl-tetramethyldisiloxane.

(d) Other examples of catalysts which may be used according to the invention, and details of their action, are described in Kunststoff-Handbuch, Volume VII, published by Vieweg and Hochtlen, Carl-Hanser-Verlag, Munich, 1966, on pages 96 and 102.

8. Water containing 1% to 10% by weight of bases which contain nitrogen such as tetraalkyl ammonium hydroxides.

9. Water containing 1% to 10% by weight of alkali metal hydroxides such as sodium hydroxide; alkali metal phenolates such as sodium phenolate or alkali metal alcoholates such as sodium methylate.

10. Water containing sodium polysulfide in the amount of 1% to 10% by weight.

11. Water containing 20% to 70% by weight of a water-binding agent, being capable of absorbing water to form a solid or a gel, such as hydraulic cement, synthetic anhydrite, gypsum or burnt lime.

12. Mixtures of the above-named curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have polydimethylsiloxane group attached to a copolymer of ethylene oxide and propylene oxide. Foam stabilizers of this kind have been described in U.S. Pat. No. 3,629,308. These additives are, preferably, used in quantities of 0% to 20%, but, preferably, 0.01% to 20%, by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering, plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retarding agents.

The preferred curing agent is an aqueous solution of silicates, sodium silicate and/or potassium silicate in water which is normally known as water glass. Aqueous solutions of silicates may be prepared in the form of 25% to 70% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are, preferably, produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reactions times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate; tris(2,3-dichloropropyl)-phosphate; polyoxypropylenechloromethylphosphonate; cresyldiphenylphosphate; tricresylphosphate; tris-(beta-chloroethyl)-phosphate; tris-(2,3-dichloropropyl)-phosphate; triphenylphosphate; ammonium phosphate; perchloroinated diphenyl phosphate; perchlorinated terephenyl phosphate; hexabromocyclodecane; tribromophenol; dibromopropyldiene; hexabromobenzene; octabromodiphenylether; pentabromotoluol; poly-tribromostyrol; tris(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogen phosphate; ammonium chloride, phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane products.

The ratios of the essential reactants and optional reactants which lead to the polyurethane silicate resinous or foamed product of this invention may vary, broadly speaking, with ranges as follows:

(a) 1 to 95 parts by weight of cellulose-silicate product containing impregnated hydrated silica;

(b) 50 parts by weight of polyisocyanate or isocyanate-terminated polyurethane prepolymer;
(c) up to 20% by weight of a foam stabilizer;
(d) up to 50% by weight of a chemically inert blowing agent, boiling within the range of from $-25°$ C. to $80°$ C.;
(e) up to 10% by weight of an activator;
(f) up to 200 parts by weight of a water-binding agent;
(g) up to 20% by weight of an emulsifying agent;
(h) 1 to 95 parts by weight of a polyol;
(i) up to 100% by weight of a curing agent.

Percentages are based on the weight of the reactants, resinous product, polyol and polyisocyanate.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly(urethane silicate) prepolymer containing the sulphonic group in the amount of 3 to 100 milliequivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in situ. The sulphonated poly(urethane silicate) prepolymer may be completely or partly neutralized at the onset by the addition of amines, metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar of hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0 to 200% by weight, based on the weight of the reactants. When a water-binding agent is added and when the curing agent is an aqueous alkali metal silicate solution, a halogen or phosphorus-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684 to 710, of the type of cement which may be used in the production of this invention and which are incorporated herein by reference.

Blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details of the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with copolymer or polyol or be reacted with the polyisocyanate to produce a polyurethane prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required in order to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied in the mold, for example, by means of a spray apparatus. The shaped products obtainable in this way may be used as building elements, e.g., in the form of sandwich elements, either as such or after they have been laminated with metals, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal castings may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor-treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high-dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reaction of the lignin-cellulose silicate and/or cellulose silicate product impregnated with hydrated silica polyol and polyisocyanate with a water-binding component may be used as surface coatings having good adhesion and resistance-to-abrasion properties, as mortars, and for making molded products, particularly in construction engineering such as for building walls, igloos, boats and for roadbuilding, etc. These products are light-weight, thermal-insulating materials with excellent mechanical properties and fire resistance. The amount of water-binding component used varies greatly, depending on the type of product desired, from 1% to 200% by weight, based on Components (a), (b) and (c) and polyisocyanate. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, alumino silicates, cements, basalt wool or powder, glass fibers, carbon fibers, graphite, carbon black, Al-, Fe-, Cri- and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components (a), (b) and (c) in many applications. Among the numerous organic polymers which may be used, e.g., as powders, granules, foam particles, beads hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluorethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked up in a kneader.

In many cases, the polyurethane resinous and foamed products produced by the invention are soluble in organic solvents and may be used as a tough coating agent for wood and metal. The mixtures of the invention are also suitable for use as impregnating agents for finishing fibers. The mixtures may also be extruded through dies or slots and be converted into fibers and foils. These fibers and foils may be used for producing synthetic incombustible paper or fleeces.

When the lignin-cellulose silicate and/or cellulose silicate product impregnated with hydrated silica, and polyisocyanate are combined with expanded clay and an alkali metal silicate solution, a very good concrete is obtained which can, for example, be used as panels in the construction field. In this case, the foam material (expended clay) plays the part of the binding material.

The object of the present invention is to provide a novel process to produce lignin-cellulose silicate and/or cellulose silicate products impregnated with hydrated silica. Another object is to produce novel lignin-cellulose silicate and/or cellulose silicate products impregnated with hydrated silica which are highly reactive. Another object is to produce lignin-cellulose silicate and/or cellulose silicate products impregnated with hydrated silica which may be used with a binder to produce paper with increased wet strength. Another object is to produce novel lignin-cellulose silicate and/or cellulose silicate products impregnated with hydrated silica which will react with polyisocyanate to produce useful foams and resinous products.

DESCRIPTION OF PREFERRED EMBODIMENTS

My invention will be illustrated in greater detail by the specific examples which follow, it being understood that these preferred embodiments are illustrative of, but not limited to, procedures which may be used in the production of cellulose silicate products. Parts and percentages are by weight unless otherwise indicated.

EXAMPLE 1

Sodium silicate particles, granules or powder are gradually added to sulfuric acid while agitating to prevent excess heat until the pH is about 6, thereby producing oxidized silicic acid particles. The oxidized silicic acid is recovered by filtering off the excess acid and salt, then washing with water and refiltering. The absorbed sulfuric acid may be neutralized with a dilute alkali metal carbonate such as sodium carbonate, then rewashed and filtered.

The sulfuric acid which is used may be either dilute or concentrated, and hydrochloric acid may be used in place of the sulfuric acid.

About 4 to 6 parts by weight of the dry oxidized silicic acid is added to an aqueous solution containing about 1 part by weight of sodium hydroxide in order to produce a solution containing 1 to 50 solids (sodium hydroxide and oxidized silicic acid).

Potassium silicate and calcium silicate may be used in place of sodium silicate.

EXAMPLE 2

An aqueous solution of sodium silicate (water glass) is oxidized by adding 1% to 3% by weight of hydrogen peroxide (about 30% aqueous solution of hydrogen peroxide), 1% by weight of sodium hydroxide and about 0.05% to 0.2% by weight, percentage based on weight of the aqueous sodium silicate solution. The sodium silicate is oxidized in 30 minutes to 4 hours, thereby producing an aqueous oxidized sodium silicate solution.

Potassium silicate may be used in place of sodium silicate.

Other inorganic or organic peroxides or redox systems may be used in place of hydrogen peroxide, such as potassium persulfate, benzyol peroxide, etc.

EXAMPLE 3

Sodium metasilicate pentahydrate granules are heated to about 80° C. to 90° C. until they melt, then about 30 ppm of cobalt naphthenate and 0.1% to 0.5% by weight of methyl ethyl ketone peroxide is added and thoroughly mixed. The oxidation is complete in 15 to 60 minutes, thereby producing oxidized sodium metasilicate pentahydrate.

In lieu of methyl ethyl ketone peroxide, other organic peroxides which may be used are: benzyol peroxide, cumine hydroperoxide, cyclohexyl hydroperoxide, tert-butyl hydroperoxide, methane hydroperoxide and others.

EXAMPLE 4

About 10 parts by weight of pine wood sawdust are mixed with 40 parts by weight of an aqueous oxidized sodium silicate solution with an $SiO_2/NaO$ of 2 and containing 25% solids, as produced in Example 2, then heated to the boiling point of the solution while agitating for 1 to 12 hours, thereby producing a mixture of alkali metal lignin-cellulose polymer, sodium silicate and unreacted pine wood sawdust. The mixture is then slowly added to a 20% sulfuric acid solution until the pH is between 1.5 and 5, thereby producing a lignin-cellulose silicate polymer impregnated with hydrated silica. The salt and acid are filtered off, then the polymer is dried.

EXAMPLE 5

About 10 parts by weight of spruce wood sawdust are mixed with 50 parts by weight of an aqueous solution containing 10% solids in the ratio of 5 parts by weight of oxidized silicic acid to 1 part by weight of sodium hydroxide, as produced in Example 1, then added to 10% sulfuric acid until the pH is 1.5 to 5, then the soluble silicic acid, salt and acid are filtered off, thereby producing a lignin-cellulose silicate polymer impregnated with hydrated silica.

EXAMPLE 6

About 30 parts by weight of the aqueous oxidized sodium silicate, as produced in Example 2, utilizing a water glass solution (41° Baume and wt. ratio of $SiO_2/Na_2O = 3.22$) to produce the oxidized sodium silicate, and 10 parts by weight of fir wood sawdust are thoroughly mixed, then allowed to react at a temperature below the boiling temperature of the mixture for 1 to 12 hours, thereby producing a mixture of alkali metal lignin-cellulose silicate polymer, sodium silicate and unreacted fir wood sawdust. About 40% to 60% of the sawdust reacts with the sodium silicate. A 40% sulfuric acid is added to the mixture until the pH is 6 to 8, thereby producing a mixture of lignin-cellulose silicate polymer impregnated with hydrated silica. The mixture is washed with water, then filtered to remove the salt, then dried.

Hydrochloric acid may be used in place of sulfuric acid.

EXAMPLE 7

About 10 parts by weight of sulfate cellulose fibers are mixed with 40 parts by weight of an aqueous oxidized sodium silicate solution containing 10% solids with a molecular weight ratio of $Na_2O:SiO_2$ of 1:3, as produced in Example 2, then added to a 20% sulfuric acid while agitating, thereby producing cellulose silicate fibers impregnated with hydrated silica. The fibers are recovered by filtration, then dried.

EXAMPLE 8

About 10 parts by weight of sulfite cellulose fibers are added to an acidic aqueous solution of oxidized silicic acid, produced by adding a 5% aqueous solution containing 4 parts by weight of oxidized silicic acid, as produced in Example 1, and 1 part by weight of sodium silicate to 5% hydrochloric acid until the pH is about 2, thereby producing cellulose silicate fibers which are impregnated with hydrated silica and are recovered by filtering off the excess acidic aqueous solution of silicic acid.

EXAMPLE 9

About 10 parts by weight of fir wood sawdust was added to 20 parts by weight of 75% sulfuric acid and the cellulose went into solution, lignin remaining in a solid form. This solution of cellulose in sulfuric acid was slowly added to an aqueous oxidized sodium silicate solution, as produced in Example 2, containing about 30% solids with a molecular weight ratio of $Na_2O:SiO_2 = 1:2$, until the pH was about 2, thereby producing a cellulose silicate product. The salt and acid were filtered off and the cellulose silicate product was washed, filtered, then dried.

EXAMPLE 10

About 10 parts by weight of sodium cellulose xanthate in dilute aqueous sodium hydroxide solution and 10 parts by weight of oxidized sodium metasilicate pentahydrate, as produced in Example 3, are mixed, then slowly poured into an aqueous acidic solution containing sulfate, 2% to 5% glucose, 1% zinc sulfate and 67% to 71% water; plasticizers may be added to the solution, thereby producing a cellulose silicate product impregnated with hydrated silica. The water, salt and carbon disulfide are filtered off. The product may be re-washed and filtered. The cellulose silicate product may be produced in the form of sheets, fibers or granules.

EXAMPLE 11

About 10 parts by weight of sodium cellulose crumbs are added to 10 parts by weight of aqueous oxidized sodium silicate containing 10% solids having an $SiO_2/NaO$ ratio of 1.6:1 by weight and are thoroughly mixed. The mixture is then slowly added to 20% sulfuric acid while agitating until the pH is between 1.5 and 5, thereby producing a cellulose silicate product impregnated with hydrated silica. The product is recovered by filtering off the water, salt and excess soluble hydrated silica. The product is then dried.

EXAMPLE 12

About 30 parts by weight of oxidized water glass solution containing about 35% solids of $SiO_2/NaO$ with a weight ratio of 3.22:1 are mixed with 10 parts by weight of fir wood sawdust and allowed to sit at room temperature for 12 hours, thereby producing a mixture of sodium lignin-cellulose silicate, sawdust and sodium silicate. The mixture is then slowly added to a 20% sulfuric acid until the pH is between 1.5 and 5, thereby producing lignin-cellulose silicate product impregnated with hydrated silica. The product is left in the aqueous solution of sodium sulfate, sulfuric acid and silicic acid, thereby further reacting the silicic acid with the cellulose and further hydrolyzing the product. The product is then washed with water, filtered and dried. the lignin-cellulose bond remains intact.

The lignin-cellulose silicate product is soluble organic polyols, such as ethylene polyether triols, ethylene polyester amine surcose polyols, propylene polyether triols, phenol amine polyols. The lignin-cellulose silicate product reacts with MDI to produce a liquid polyurethane prepolymer.

EXAMPLE 13

About 10 parts by weight of the lignin-cellulose silicate product in the form of a dry powder, as produced in Example 12, are mixed with 10 parts by weight of MDI (PAPI 27 produced by Upjohn) and are soluble in the MDI. The lignin-cellulose silicate polymer reacts with the MDI to form a liquid polyurethane silicate prepolymer.

The polyurethane prepolymer is cured by adding about 5 parts by weight of water glass and 41° Baume with an $SiO_2/NaO$ ratio of 3.22 to 1, and thoroughly mixing, thereby producing a polyurethane silicate product.

EXAMPLE 14

About 10 parts by weight of dry powdered lignin-cellulose silicate product, as produced in Example 11, are mixed with 10 parts by weight of toluene diisocyanate (TDI) for 10 to 30 minutes at ambient temperature and pressure, thereby producing a liquid polyurethane silicate prepolymer.

The polyurethane silicate prepolymer is then heated to about 50° C. to 70° C., thereby curing the prepolymer and producing a polyurethane silicate product.

EXAMPLE 15

About 12 parts by weight of powdered lignin-cellulose silicate and/or cellulose silicate product, produced in the Example listed below, and 20 parts by weight of a polyol, listed below, are emulsified with 5 parts by weight of aqueous sodium silicate containing 65% solids of $SiO_2:NaO$ ratio of 1.6:1 and 15 parts by weight of TDI are thoroughly mixed; the mixture begins to expand in 15 to 30 seconds and expands to 6 to 15 times its original volume, thereby producing a rigid polyurethane silicate foam.

| Example | Lignin-Cellulose Silicate | Polyol |
|---|---|---|
| a | of Example 6; | Glycerol; |
| b | of Example 7; | Triethylene glycol; |
| c | of Example 9; | Propylene glycol; |
| d | of Example 10; | Polyethylene glycol (mol. wt, 480); |
| e | of Example 11; | Polypropylene glycol (mol. wt. 500); |
| f | of Example 8; | Polypropylene glycol (mol. wt. 1000); |
| g | of Example 12; | Polyester (3.8 mols glycerol, 2.5 mols adipic acid and 0.5 mol phthalic acid); |
| h | of Example 6; | Polyether (polyepichlorohydrin) (mol. wt. 530); |
| i | of Example 12; | Castor oil; |
| j | of Example 11; | Castor oil; |
| k | of Example 6; | Liquid hydroxyl-terminated polybutadiene having 20% pendant vinyl groups (POLY B-D R45M, Arco Chemical Co.); |
| l | of Example 12. | Liquid polysulfide polymer containing hydroxyl groups. |

EXAMPLE 16

About 10 parts by weight of powdered lignin-cellulose silicate product produced in Example 12, 5 parts by weight of an aqueous sodium silicate containing 60% solid of $SiO_2:NaO$ ratio of 1.6:1, 0.5 part by weight of triethylenetriamine, 0.01 part by weight of tin octoate, 3 parts by weight of trichlorotrifluoroethane, 0.3 part by weight of silicon surfactant (L5303 Surfactant by Union Carbine), 0.5 part by weight of an organic surfactant (LK-221 by Air Products) and 20 parts by weight of an isocyanate-terminated polyurethane prepolymer, listed below, are thoroughly mixed at ambient temperature to 70° C.; then in a few seconds to about 10 minutes, the mixture begins to expand, expanding 3 to 8 times its original volume to produce a tough, rigid, polyurethane silicate foam.

| Example | Isocyanate-Terminated Polyurethane Prepolymer |
|---|---|
| a | Residue of tolylene diisocyanate distillation with about 20% by weight of NCO with polyethylene glycol (mol. wt. 1500) to produce a prepolymer with an NCO content of about 11%; |
| b | Tolylene diisocyanate with polyethylene glycol (mol. wt. 2000) to produce a prepolymer with an NCO content of about 28%; |
| c | Tolylene diisocyanate with a polyester (4 mols of glycerol, 2.5 mols of adipic acid and 0.5 mol of phthalic anhydride) to produce a prepolymer with an NCO content of about 23%; |
| d | Tolylene diisocyanate with polypropylene glycol (mol. wt. 500) with an NCO/OH ratio of 25:1; |
| e | 20% solution of a distillation residue of the distillation of commercial tolylene diisocyanate in a crude phosgenation product of an aniline-formaldehyde condensation with an NCO content of about 30% with polyethylene glycol (mol. wt. 1000) to produce an isocyanate-terminated prepolymer with an NCO content of about 17%; |
| f | Diisocyanatodiphenylmethane with a tetrafunctional polypropylene glycol (mol. wt. 500) to produce a prepolymer having about 22% NCO groups; |
| g | Tolylene diisocyanate with a liquid hydroxyl-terminated polybutadiene (mol. wt. about 1000), available from Arco Chemical Co. under trade designation of "POLY B-D R15M" and "POLY B-D R45M" to produce a prepolymer with an NCO content of 7%; |
| h | Tolylene diisocyanate with a hydroxyl-group containing polysulfide polymer to produce a prepolymer with an NCO content of about 12%; |
| i | Phenylene-bis-phenyl diisocyanate with a liquid polyepichlorohydrin to produce a prepolymer of about 16%, and 20% by weight of a resin extender, polyalphamethyl styrene, are added, percentage based on weight of prepolymer. |

EXAMPLE 17

About 10 parts by weight of oak wood chips are wet with an aqueous sodium silicate solution containing about 20% solid with an $SiO_2NaO$ ratio of 2:1, then wet in a solution of 10% sulfuric acid, thereby producing wood chips with an outer layer of lignin-cellulose silicate and impregnated with hydrated silica. The modified chips are dried, then mixed with crude MDI and pressed into the form of a panel board. Any excess MDI is removed. The modified chips in the form of a panel board are heated to 60° C. to 80° C. while being pressed. The MDI is cured by reacting with the water in the wood and by reacting with the lignin-cellulose silicate and hydrated silica. The hydrated silica improves the flame-resistant properties of the panel. The panel may be used in construction of houses, furniture, fixtures, etc.

EXAMPLE 18

About 12 parts by weight of the powdered lignin-cellulose silicate product, as produced in Example 12, 10 parts by weight of crude MDI (PAPI produced by Upjohn), 3 parts by weight of trichlorotrifluoroethane and 0.5 part by weight of triethylenediamine are mixed thoroughly; the mixture begins to expand in 15 to 45 seconds, thereby producing a rigid polyurethane silicate foam.

EXAMPLE 19

About 8 parts by weight of powdered lignin-cellulose silicate product, as produced in Example 12, are mixed with 0.5 part by weight of water, 0.05 part by weight of triethanolamine, 0.01 part by weight of tin octoate, 1 part by weight of trichlorofluoromethane, then thoroughly mixed with an organic polyisocyanate, listed below. The mixture expands 3 to 10 times its original volume, thereby producing a rigid polyisocyanate-silicate product.

The polyisocyanates used in this Example are: TDI, polyphenylpolymethylene-isocyanate, diisocyanatodiphenylmethane, methylene bis phenyl diisocyanate, residue of tolylene diisocyanate with about 20% by weight of NCO, metaphenylene, sulphonated polyphenylpolymethylene-polyisocyanate (sulphur content: about 1%, isocyanate content 30%) and 20% solution of a distillation residue of the distillation of commercial tolylene diisocyanate in diisocyantodiphenylamine.

EXAMPLE 20

The wet cellulose-silicate fibers, impregnated with hydrated silica as produced in Example 7, are mixed with a binder, aqueous sodium silicate solution containing 10% solids of $SiO_2$:NaO ratio of 3.2:1, then formed into a sheet of paper and dried.

EXAMPLE 21

The wet cellulose-silicate fibers, impregnated with hydrated silica, as produced in Example 8, are mixed with a binder, 5% aqueous solution of a thermosetting resin, tetraethylenepentamine-epichlorohydrin resin, then made into handsheets on a small sheet-making machine. The sheet is then dried at about 160° F.

EXAMPLE 22

The wet cellulose-silicate fibers impregnated with hydrated silica, as produced in Example 7, are mixed with a binder, an aqueous phenol-formaldehyde resin emulsion, then made into hand sheets on a small sheet-making machine. The sheets are then dried at 160° F.

EXAMPLE 23

The wet cellulose-silicate fibers impregnated with hydrated silica, as produced in Example 8, are suspended in water to about 1.5% consistency, then a binder, an emulsion of polystyrene resin, in an amount equal to the dry weight of the fibers, is thoroughly mixed with the fibers and the mixture is used to form handsheets on a handsheet machine and the sheets are dried.

Other binders may be used in place of polystyrene emulsion, such as starch, wax emulsion, emulsion of epichlorohydrinpolyamine resins, emulsions of epichlorohydrin-polyamine-silicate resins, acrylate emulsions, styrene-ethyl acrylate copolymer emulsion, polyvinyl chloride emulsion, polyvinyl acetate emulsion, polyvinyl alcohol emulsion, alkyd resin emulsion phenol-formaldehyde resin emulsion, coumarone resin emulsion, phenol-formaldehyde silicate emulsions, urea-formaldehyde resins, urea formaldehyde-silicate resin emulsions, polyacrylate resin emulsions, polyacrylonitrile polymer emulsion, polyamide resin emulsion, epoxy resins, epoxy silicate resins, polyester resins, polybutadiene polymer emulsions, styrene-butadiene copolymer emulsions, polychloroprene polymer emulsion, allyl halide-epihalohydrin-polyamine-silicate resin emulsion, polyamide silicate resin emulsion, ethylenepolysulfide silicate polymer emulsion, polyacrylate silicate emulsion, polyvinyl silicate polymer emulsion, polyethylacrylate emulsion ("HAS" from Rohm and Haas), rubber latex and others.

EXAMPLE 24

The wet lignin-cellulose-silicate product, impregnated with hydrated silica, as produced in Example 6, is mixed with a binder, Portland cement in an amount equal to about twice the weight of the lignin-cellulose-silicate product, then molded in the form of a panel. The panel is dried and may be used in construction.

Other water-binding agents may be used in place of Portland cement, such as other hydraulic cements, gypsum, burnt lime and synthetic anhydrites. Larger amounts of water-binding agents may be used.

EXAMPLE 25

A 5% aqueous solution of oxidated silicic acid and sodium hydroxide containing 5 parts by weight of oxidated silicic acid, as produced in Example 1, and 1 part by weight of sodium hydroxide are slowly added to 10% sulfuric acid while agitating until the pH of 2 is reached, thereby producing an acidic aqueous solution of hydrated silica. A fabric of cellulose acetate is placed in the acidic aqueous solution of hydrated silica, thereby producing a cellulose acetate silicate product, impregnated with hydrated silica. The product is then dried.

Rayon fabric may be used in place of cellulose acetate. The wet fabric may be treated with a binder, such as a plastic binder.

Paper may also be reacted with the acidic aqueous solution of hydrated silica, increasing the weight of the paper by over 100%.

Buffering acid may be added to the acidic aqueous solution of hydrated silica, such as complex acids of acidic sulphites and acetones, ketones and aldehydes, to increase the pH of the dried lignin-cellulose silicate product.

Although specific materials and conditions were set forth in the above examples, these were merely illustrative of preferred embodiments of my invention. Various other compositions, such as the typical materials listed above, may be used, where suitable. The reactive mixtures and products of my invention may have other agents added thereto to enhance or otherwise modify the reaction and products.

I claim:

1. The process for the production of polyurethane lignin-cellulose silicate prepolymer by the following steps:
   (a) mixing and reacting 1 to 100 parts by weight of an oxidized silicate compound, selected from the group consisting of oxidized alkali metal silicate, oxidized alkaline earth metal silicate, oxidized mono alkali metal silicic acid, oxidized silicic acid and mixtures thereof, 50 parts by weight of plant cellulose particles, selected from the group consisting of cotton, wood cellulose, regenerated cellulose, sulfate cellulose produced by the Kraft process, sulfite cellulose, mechanical pulp cellulose, vegetable cellulose, cellulose esters and semichemical cellulose, a salt-forming compound selected from the group consisting of hydrochloric and sulfuric acid and in an amount wherein the mixture of the components has a pH of 1.5 to 5 after the reaction is complete, thereby producing lignin-cellulose silicate product containing impregnated hydrated silica;
   (b) mixing 50 parts by weight of an organic polyisocyanate or polyisothiocyanate with 1 to 100 parts by weight of the dried lignin-cellulose silicate product containing impregnated hydrated silica and allowing to react,
   (c) thereby producing a polyurethane lignin-cellulose silicate prepolymer.

2. The product produced by the process of claim 1.

3. The process of claim 1 wherein the polyisocyanate is selected from the group consisiting of aliphatic, cycloaliphatic, aromatic and heterocyclic polyisocyanates and mixtures thereof.

4. The process of claim 1 wherein an additional step is taken wherein a curing agent in an amount up to 100% by weight, based on the weight of the reactants, is mixed and reacted with the polyisocyanate silicate prepolymer, thereby producing a polyisocyanate lignin-cellulose silicate product.

5. The process of claim 1 wherein an additional step is taken wherein 1 to 95 parts by weight of an organic compound, having at least two reactive hydrogens that will react with an isocyanate group, up to 100% by weight of a curing agent, based on the weight of the reactants, up to 10% by weight of an activator and up to 20% by weight of an emulsifying agent, inorganic or organic particulate or pulverulent material, are added in step (b) of claim 1, then mixed and reacted, thereby producing a polyurethane lignin-cellulose silicate product.

6. The product produced by the process of claim 4.

7. The product produced by the process of claim 5.

8. The process of claim 5 wherein the organic polyisocyanate is a phosgenation product of an aniline formaldehyde condensation.

9. The process of claim 1 wherein water is added to the oxidated silicate compound, selected from the group consisting of sodium silicate and potassium silicate.

10. The process of claim 1 wherein the oxidated silicate compound is an aqueous oxidized alkali metal solution, selected from the group consisting of sodium silicate and potassium silicate.

11. The process of claim 1 wherein the oxidated silicate compound is an aqueous oxidated sodium silicate solution which is mixed with plant cellulose particles, then added to the salt-forming compound until the pH is between 1.5 and 5, thereby producing a lignin cellulose-silicate product containing impregnated hydrated silica in step (a) of claim 1, the salt, water and salt-forming compound being filtered off.

12. The process of claim 1 wherein the oxidated silicate compound is an aqueous solution of oxidized silicic acid and sodium hydroxide in the ratio of 4 to 8 parts by weight of oxidized silicic acid to 1 part by weight of sodium hydroxide, containing 1% to 10% by weight of solids, which is then added to a 5% to 40% sulfuric acid to produce an acidic solution of oxidated silicic acid with a concentration of 2% to 20% calculated as $SiO_2$ and a pH of 1.5 to 5; then the cellulose particles are mixed with the solution, thereby producing a cellulose-silicate product impregnated with hydrated silica in step (a) of claim 1; the cellulose-silicate product is recovered by filtration, then dried.

13. The process of claim 1 wherein the components of step (a) of claim 1 are mixed simultaneously and the resulting mixture has a pH of from 1.5 to 5.

14. The process of claim 1 wherein the cellulose particles are sodium cellulose xanthate particles which have been dissolved in an aqueous sodium hydroxide solution.

15. The process of claim 1 wherein the cellulose particles are first treated with an ammonial copper solution to form a viscous solution.

16. The process of claim 1 wherein the cellulose particles are first dissolved in a 70% to 80% sulfuric acid solution.

17. The process of claim 1 wherein up to 20% by weight of a water-binding agent, selected from the group consisting of hydraulic cement, gypsum, burnt lime, synthetic anhydrite and mixtures thereof, up to 100% by weight of a curing agent, percentage based on weight of reactants, 1 to 95 parts by weight of an organic compound having at least two reactive hydrogens that will react with isocyanate groups, up to 20% by weight of an emulsifying agent, up to 10% by weight of an activator, percentage being based on weight of reactants, inorganic or organic particulate or pulverulent material are mixed and reacted in step (b) of claim 1, thereby producing a polyurethane lignin-cellulose silicate product.

18. The product produced by the process of claim 17.

19. The process of claim 1 wherein an isocyanate-terminated polyurethane prepolymer is used in place of the organic polyisocyanate in step (b) of claim 1.

20. The product produced by the process of claim 19.

* * * * *